United States Patent
Tseng et al.

(10) Patent No.: US 6,654,233 B2
(45) Date of Patent: Nov. 25, 2003

(54) POSITIONING UNIT FOR AN ELECTRONIC DEVICE

(75) Inventors: Hua-Chung Tseng, Hsichih (TW); Chia-Liang Yen, Hsichih (TW); Chu-Hsian Chian, Hsichih (TW); Chang-Long Hsu, Hsichih (TW); Shu-Hsien Chu, Hsichih (TW)

(73) Assignee: Wistron Corporation, Taipei Hsien (TW)

( * ) Notice: Subject to any disclaimer, the term of this patent is extended or adjusted under 35 U.S.C. 154(b) by 38 days.

(21) Appl. No.: 10/123,772

(22) Filed: Apr. 16, 2002

(65) Prior Publication Data

US 2003/0086241 A1 May 8, 2003

(30) Foreign Application Priority Data

Nov. 8, 2001 (TW) ........................................ 90219221 U

(51) Int. Cl.[7] .............................................. E05D 11/10
(52) U.S. Cl. ........................ 361/681; 361/682; 361/679; 361/683; 16/308; 16/366; 312/223.2
(58) Field of Search ................................. 361/679, 680, 361/681, 682, 683; 345/30, 1.1; 364/708.1, 708; 16/239, 306, 330–334, 337–341, 385, 368, 918–922; 248/183, 228.1, 917, 923; 403/119–121, 146, 83, 84, 95, 103; 292/42, 145

(56) References Cited

U.S. PATENT DOCUMENTS

| | | | | |
|---|---|---|---|---|
| 5,081,742 A | * | 1/1992 | Kobayashi | 16/337 |
| 5,109,572 A | * | 5/1992 | Park | 16/334 |
| 5,178,481 A | * | 1/1993 | Kawamura | 403/92 |
| 5,333,356 A | * | 8/1994 | Katagiri | 16/340 |
| 5,666,694 A | * | 9/1997 | Slow et al. | 16/368 |
| 5,872,606 A | * | 2/1999 | Kim | 349/58 |
| 6,034,867 A | * | 3/2000 | Seo | 361/683 |
| 6,108,868 A | * | 8/2000 | Lin | 16/340 |
| 6,182,330 B1 | * | 2/2001 | Novin et al. | 16/341 |
| 6,469,802 B1 | * | 10/2002 | Yamaguchi | 358/1.8 |
| 6,513,197 B2 | * | 2/2003 | Rude et al. | 16/342 |

FOREIGN PATENT DOCUMENTS

JP         2000066609 A  *  3/2000  ......... G09F/009/00

* cited by examiner

Primary Examiner—Michael Datskovsky
(74) Attorney, Agent, or Firm—Merchant & Gould, P.C.

(57) ABSTRACT

A positioning unit is mounted on an electronic device and includes a catch member and a locking member. The catch member defines a gap which has a width that is reducible when the catch member moves from a non-catching position to a catching position and that is expandable when the catch member moves from the catching position to the non-catching position. The locking member has an engaging end extending into the gap. The locking member is operable to move the catch member from the non-catching position to the catching position and from the catching position to an urging position. The engaging end of the locking member engages the catch member when the width of the gap is reduced upon movement of the catch member to the catching position. The engaging end of the locking member disengages from the catch member when the width of the gap is enlarged upon movement of the catch member to the non-catching position.

13 Claims, 6 Drawing Sheets

POSITIONING UNIT FOR AN ELECTRONIC DEVICE

CROSS-REFERENCE TO RELATED APPLICATION

This application claims priority of Taiwan patent Application No. 90219221, filed on Nov. 8, 2001.

BACKGROUND OF THE INVENTION

1. Field of the Invention

This invention relates to a positioning unit for an electronic device, more particularly to a positioning unit for positioning a display module relative to a main body of a portable computer.

2. Description of the Related Art

FIG. 1 illustrates a conventional portable computer 9 which includes a display module 901 and a main body 902 pivoted to the display module 901 via a hinge member 903 so as to permit the display module 901 to be rotatable about a vertical axis (Z) and a horizontal axis (X). The conventional portable computer 9 is disadvantageous in that components of the hinge member 903 tend to loosen after a period of use, thereby resulting in undesired inclination of the display module 901 relative to the main body 902. Moreover, since the display module 901 is supported on the main body 902 solely by the hinge member 903, turning and positioning of the displayed module 901 relative to the main body 902 tends to be unstable.

SUMMARY OF THE INVENTION

Therefore, the object of the present invention is to provide a positioning unit for an electronic device that is capable of overcoming the aforementioned drawbacks.

According to the present invention, there is provided a positioning unit for an electronic device that has first and second housings pivoted to each other. The positioning unit includes: a catch member adapted to be mounted movably in the first housing, and having a front end that defines a gap having a width which is reducible when the catch member is moved in a transverse direction from a non-catching position to a catching position and which is expandable when the catch member is moved from the catching position to the non-catching position; and a locking member adapted to be mounted movably on an exterior of the first housing and having an engaging end that extends into the gap and a retaining element that is adapted to releasably engage the second housing. The locking member is operable for moving the catch member from the non-catching position to the catching position when an external force is applied to the locking member. The locking member is movable together with the catch member in the transverse direction from an engaging position, in which, the catch member is moved to the catching position, the engaging end engages the front end of the catch member by virtue of reduction of the width of the gap, and the retaining element is adapted to releasably engage the second housing so as to lock the second housing to a disengaging position, in which, the catch member is moved to the non-catching position, the engaging end disengages from the front end of the catch member by virtue of expansion of the width of the gap, and the retaining element is adapted to disengage from the second housing so as to unlock the second housing.

BRIEF DESCRIPTION OF THE DRAWINGS

In drawings which illustrate an embodiment of the invention.

DETAILED DESCRIPTION OF THE PREFERRED EMBODIMENT

Figure 1:
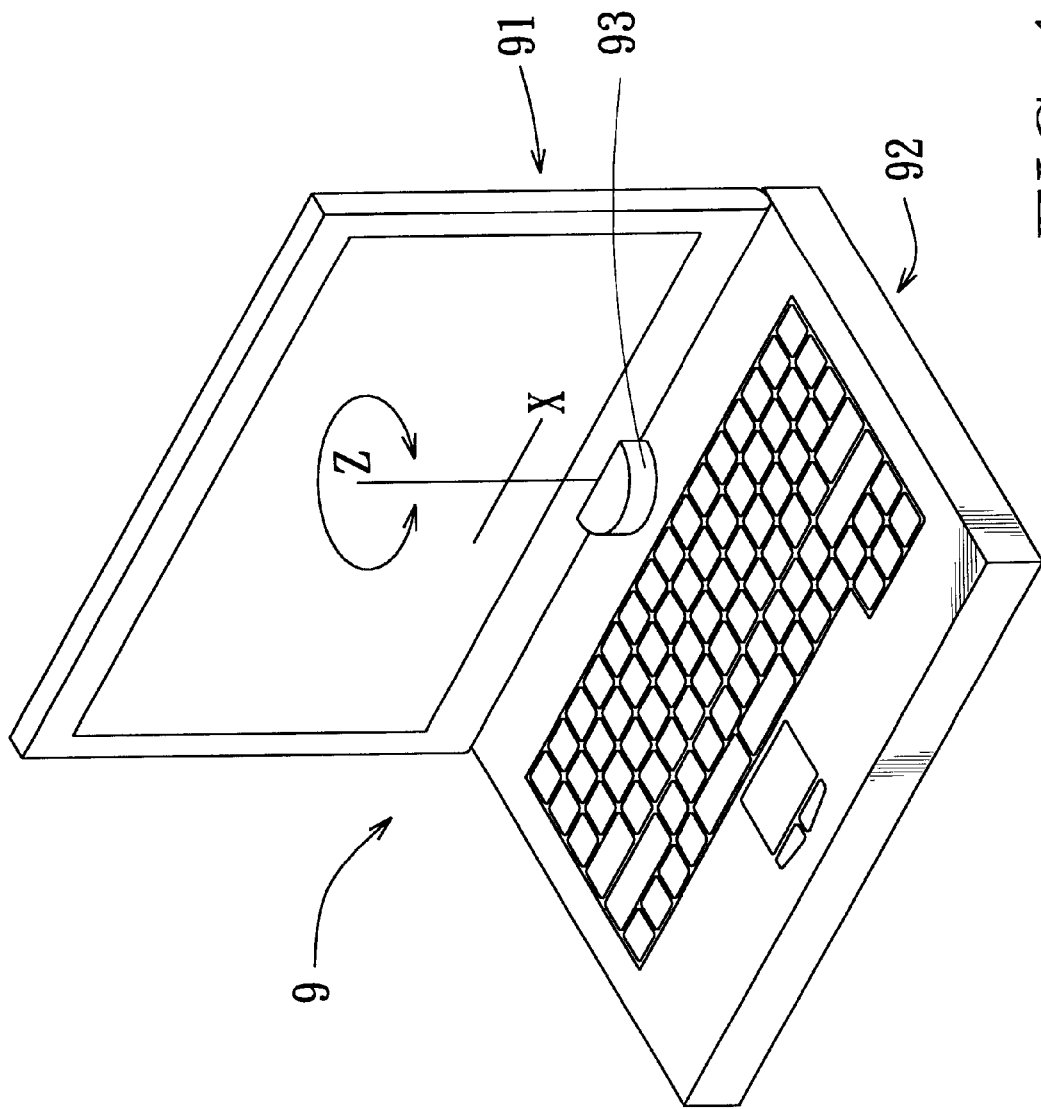
FIG. 1 is a perspective view of a conventional portable computer.
Figure 2:
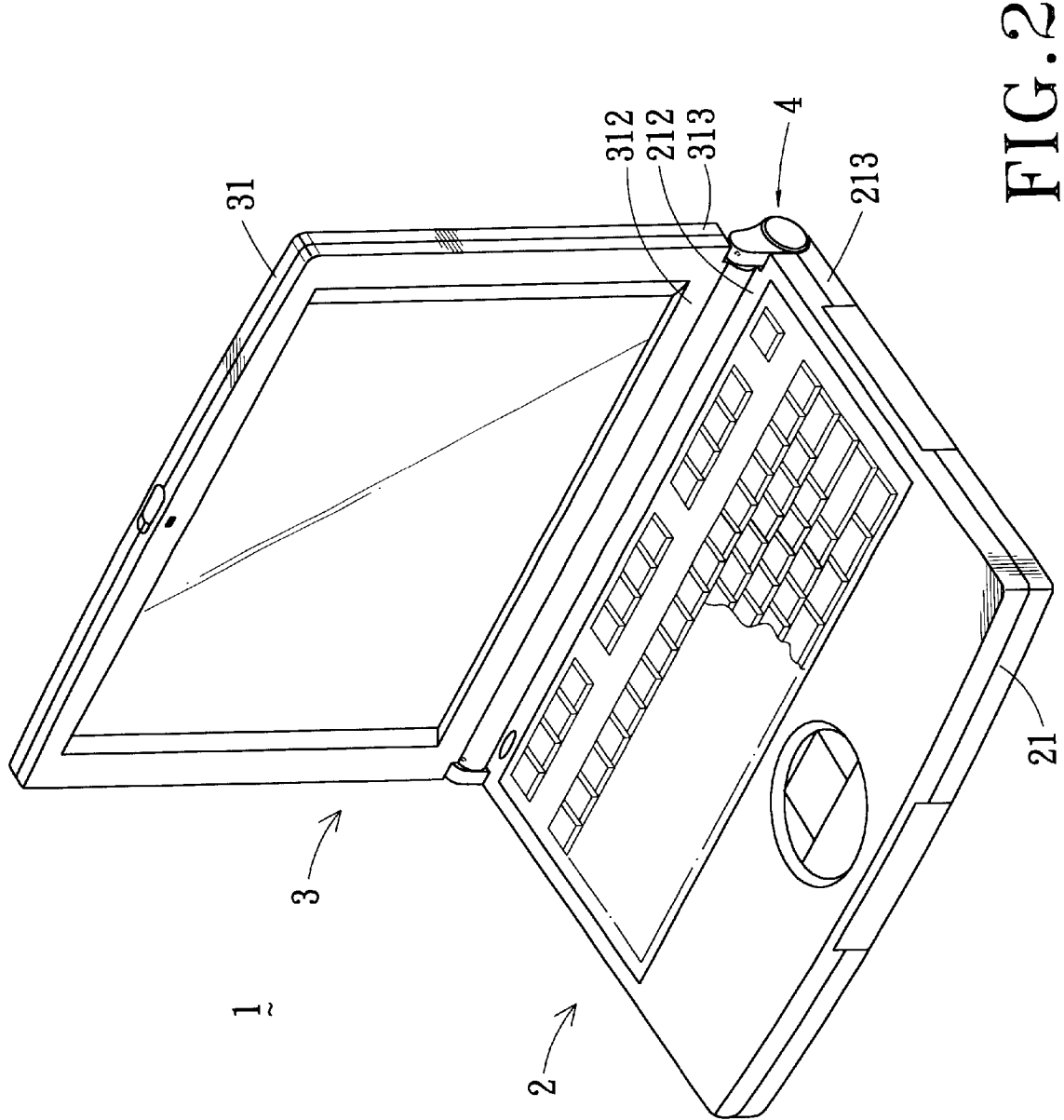
FIG. 2 is a perspective view of a portable computer embodying this invention.
Figure 3:
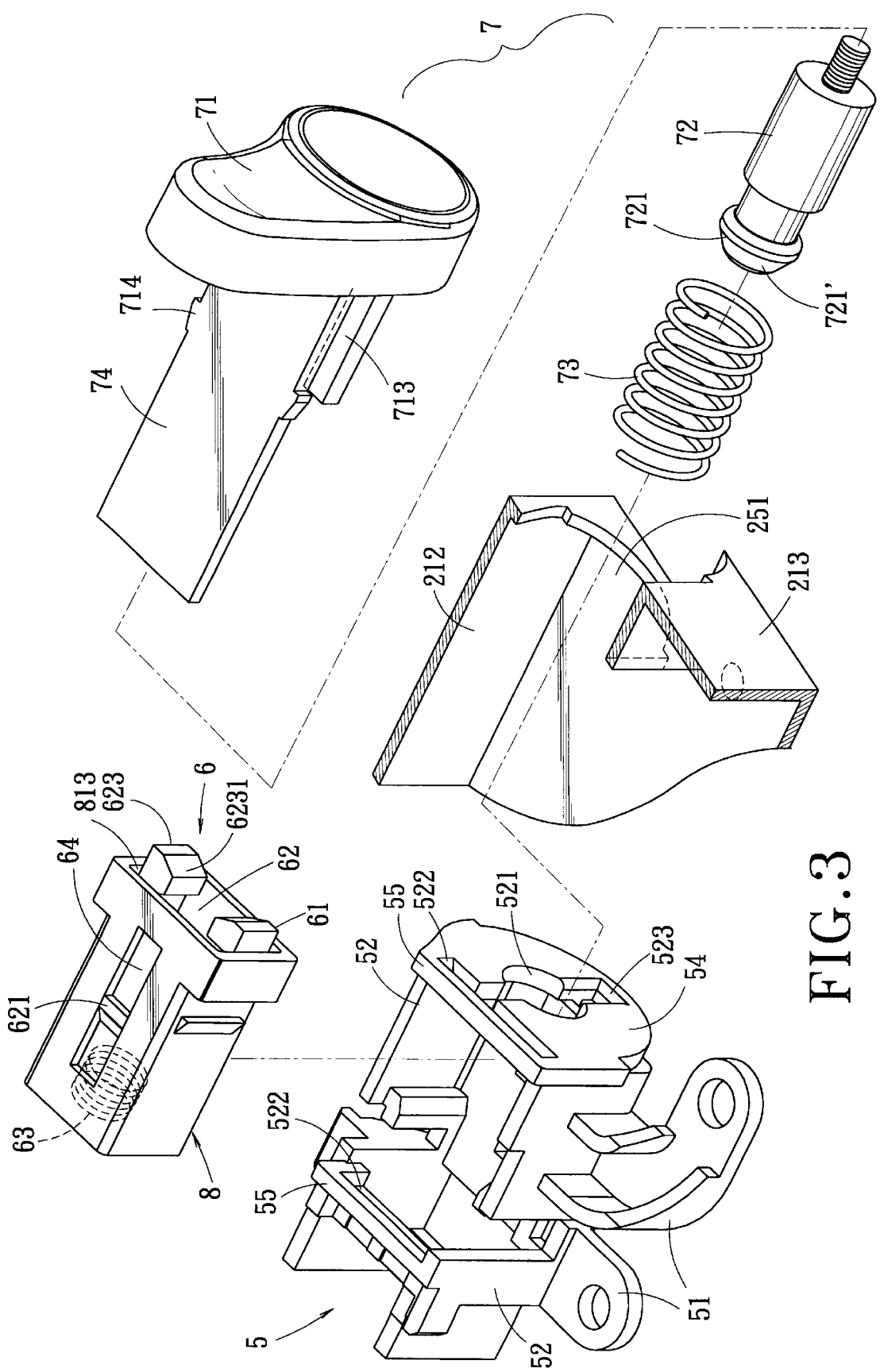
FIG. 3 is an exploded perspective view of a positioning unit of the portable computer of FIG. 2.
Figure 5:
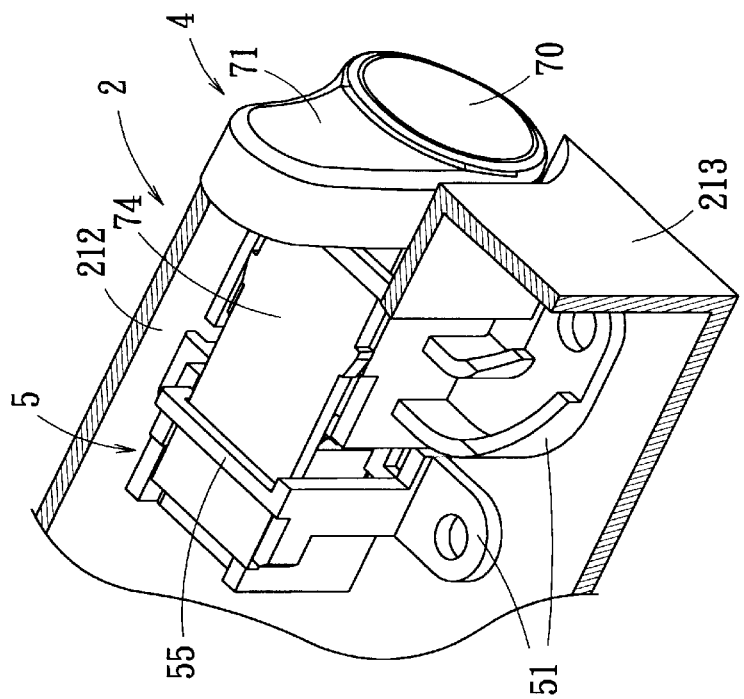
FIG. 5 is a fragmentary sectional perspective view to illustrate how the positioning unit of FIG. 3 is mounted in a first housing of the portable computer of FIG. 2.
Figure 4:
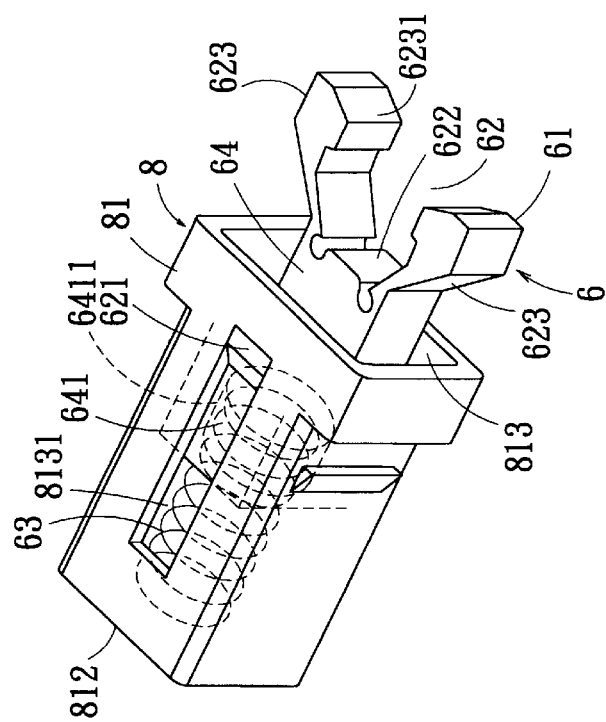
FIG. 4 is a perspective view of a catch member and a constricting member of the positioning unit of FIG. 3, with the catch member at a non-catching position.
Figure 7:
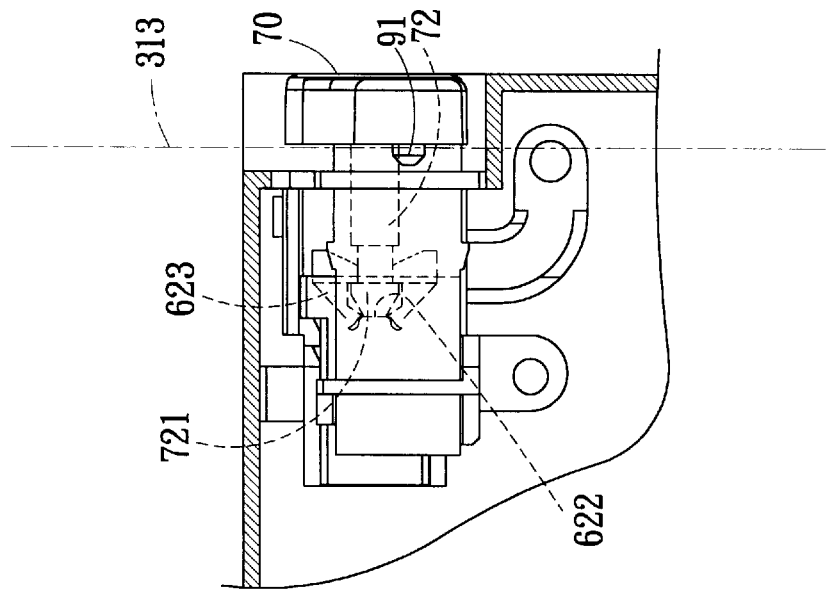
FIG. 7 is a fragmentary sectional view to illustrate the locking member when positioned at an engaging position.
Figure 6:
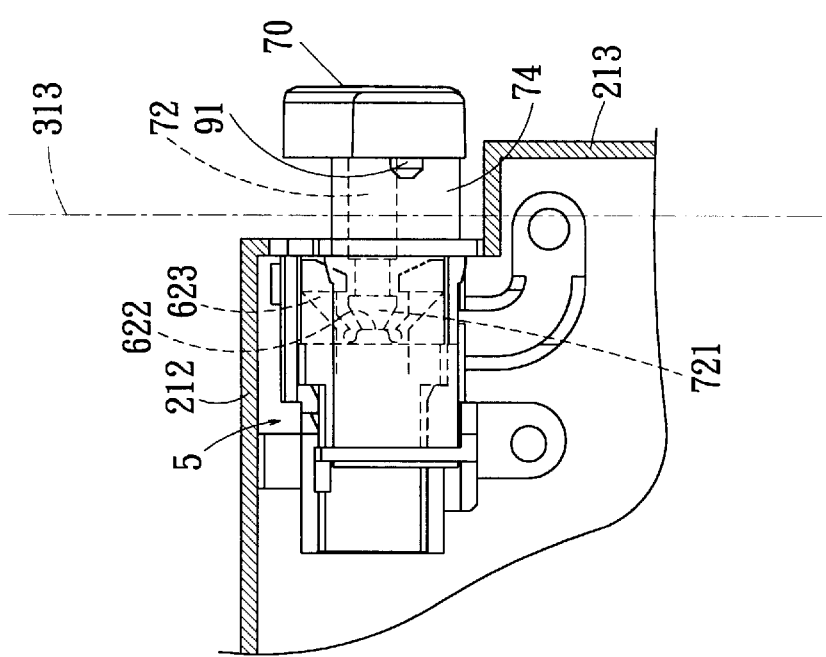
FIG. 6 is a fragmentary sectional view to illustrate a locking member when positioned at a disengaging position.
Figure 8:
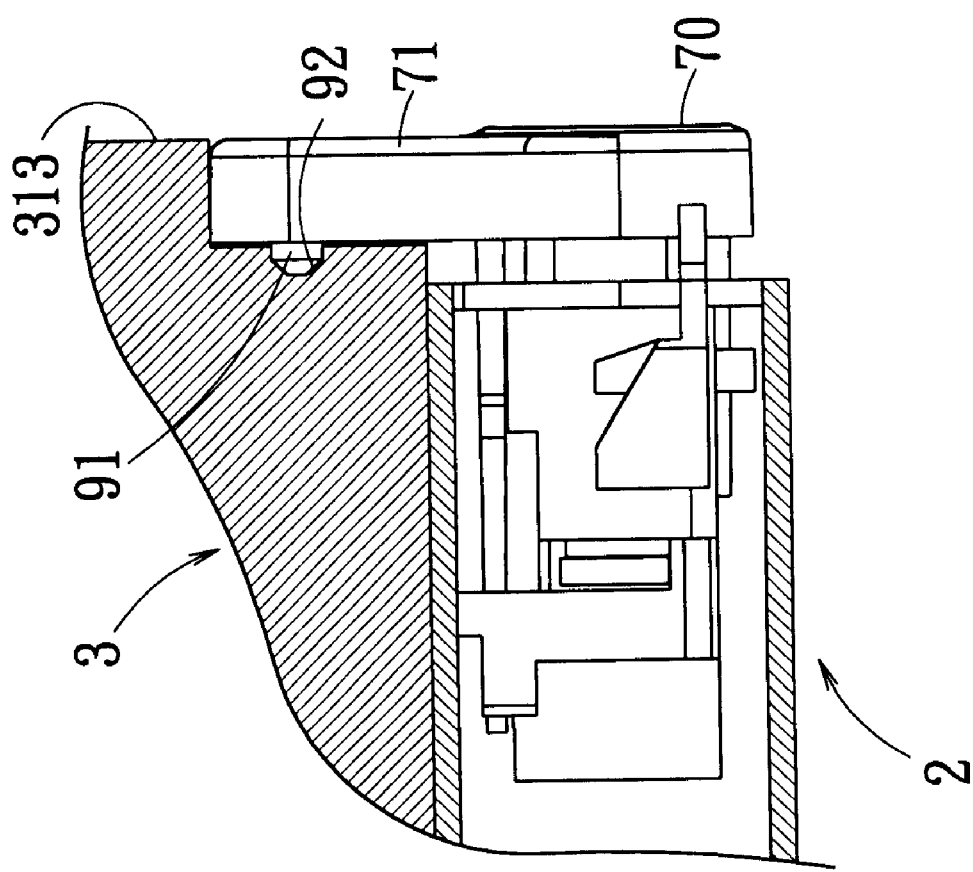
FIG. 8 is a fragmentary sectional view to illustrate a retaining element when engaging first and second housings of the portable computer.

FIGS. 2 to 8 illustrate a preferred embodiment of an electronic device of this invention. As an example, the electronic device is a portable computer 1 that includes a main body 2, a display module 3, and a positioning unit 4.

The main body 2 includes a first housing 21 with a first rear end 212 and a first side end 213 transverse to the first rear end 212. The display module 3 includes a second housing 31 with a second rear end 312 and a second side end 313 transverse to the second rear end 312. The second rear end 312 is pivoted to the first rear end 212 via a hinge member (not shown) so as to permit rotation of the display module 3 about a vertical axis and a horizontal axis relative to the main body 2. A retaining groove 92 is formed in the second side end 313 of the second housing 31.

The positioning unit 4 includes: an urging member 63 disposed in the first housing 21; a catch member 6 mounted movably in the first housing 21 adjacent to the first side end 213 and the first rear end 212 of the first housing 21, and having a front end 61 that defines a gap 62 which has a width that is reducible when the catch member 6 is moved inwardly of the first housing 21 in a transverse direction relative to the first side end 213 of the first housing 21 from a non-catching position (see FIG. 6) to a catching position (see FIG. 7) and that is expandable when the catch member 6 is moved from the catching position to the non-catching position, the catch member 6 being further movable inwardly of the first housing 21 from the catching position to an urging position, in which, the urging member 63 is compressed by the catch member 6 so as to urge the catch member 6 to return from the urging position to the non-catching position; a locking member 7 mounted movably on the first side end 213 of the first housing 21 adjacent to the catch member 6, and having an engaging end 721 extending into the gap 62 and a retaining element 91 projecting therefrom toward the second side end 313 of the second housing 31. The locking member 7 is operable to move the catch member 6 from the non-catching position to the catching position, and from the catching position to the urging position. The locking member 7 is movable together with the catch member 6 in the transverse direction from an engaging position, in which, the catch member 6 is moved to the catching position, the engaging end 721 engages the front end 61 of the catch member 6 by virtue of reduction of the width of the gap 62, and the retaining element 91 releasably engages the retaining groove 92 so as to lock the second housing 31 to a disengaging position, in which, the catch member 6 is moved to the non-catching position, the engaging end 721 disengages from the front end 61 of the catch member 6 by virtue of expansion of the width of the gap 62, and the retaining element 91 disengages from the retaining groove 92 so as to unlock the second housing 31.

A constricting member 8 includes a casing 81 that has a rear closed end 812 and a front opening 813 opposite to the rear closed end 812. The catch member 6 includes a sliding block 64 that extends through the front opening 813 and into the casing 81, and a pair of elastic catching arms 623 that extend outwardly of the casing 81 from the sliding block 64 through the front opening 813 and that flare from the front opening 813 to define the gap 62. The catching arms 623 elastically move toward each other so as to reduce the width of the gap 62 when sliding over a periphery of the front opening 813 into the casing 81 upon moving the catch member 6 from the non-catching position to the catching position. The catching arms 623 have opposing anchored free ends 6231 that engage the engaging end 721 of the locking member 7 when the catch member 6 is positioned at the catching position.

The sliding block 64 has a rear end 641 formed with a spring retaining hole 6411, and a front end 622 opposite to the rear end 641. The urging member 63 is in the form of a coil spring that is received in the spring retaining hole 6411 and that abuts against the rear closed end 812 of the casing 81 so as to urge the catch member 6 to move to the non-catching position when the catch member 6 is positioned at the urging position.

The casing 81 has a top wall formed with a slot 8131. The sliding block 64 has a guide 621 that protrudes therefrom into the slot 8131 so as to guide movement of the catch member 6 in the transverse direction.

A mounting seat 5 is mounted securely in the first housing 21 via screw means (not shown) extending through two cast plates 51 and the first housing 2, and has two opposing side walls 52, opposing front and rear top beams 55 interconnecting the side walls 52 and formed with two opposing front and rear top slits 522, and a front wall 54 that extends downwardly from the front top beam 55 and that is formed with a through-hole 521 beneath the front top slit 522 and a notch 523 beneath the through-hole 521. The casing 81 is mounted securely in the mounting seat 5 below and between the front and rear top beams 55. The locking member 7 includes a button 70 mounted exteriorly on the first side end 212 of the first housing 21, a guide plate 74 that extends from the button 70 through the front and rear top slits 522, and a pressing shaft 72 that extends from the button 70 and that has a free end 721' which defines the engaging end 721 of the locking member 7 and which extends through an opening 251 in the first side end 213 of the first housing 21 and the through-hole 521 and into the gap 62 to abut against the front end 622 of the sliding block 64 so as to push the catch member 6 to move in the transverse direction. The guide plate 74 has two opposite sides formed with two opposing wings 714 that engage a periphery of the front top slit 522 so as to prevent removal of the locking member 7 from the front and rear top slits 522 when the locking member 7 moves from the engaging position to the disengaging position.

The locking member 7 further includes a biasing member 73 that is in the form of a coil spring and that is sleeved on the pressing shaft 72 for facilitating movement of the locking member 7 in the transverse direction.

The locking member 7 further includes a linkage 71 that extends from the button 70 to the second side end 313 of the second housing 31 in a direction transverse to the guide plate 74. The retaining element 91 protrudes from the linkage 71 toward the retaining groove 92. A guide post 713 extends from the button 70 underneath the guide plate 74 through the notch 523 and into the mounting seat 5.

With the inclusion of the positioning unit 4 in the portable computer 1, the drawbacks as encountered in the prior art can be eliminated.

With the invention thus explained, it is apparent that various modifications and variations can be made without departing from the spirit of the present invention. It is therefore intended that the invention be limited only as recited in the appended claims.

We claim:

1. A positioning unit for an electronic device having first and second housings pivoted to each other, said positioning unit comprising:

a catch member adapted to be mounted movably in the first housing, and having a front end that defines a gap having a width which is reducible when said catch member is moved in a transverse direction from a non-catching position to a catching position and which is expandable when said catch member is moved from the catching position to the non-catching position; and a locking member adapted to be mounted movably on an exterior of the first housing and having an engaging end that extends into said gap and a retaining element that is adapted to releasably engage the second housing, said locking member being operable for moving said catch member from the non-catching position to the catching position when an external force is applied to said locking member, said locking member being movable together with said catch member in the transverse direction from an engaging position, in which, said catch member is moved to the catching position, said engaging end engages said front end of said catch member by virtue of reduction of the width of said gap, and said retaining element is adapted to releasably engage the second housing so as to lock the second housing to a disengaging position, in which, said catch member is moved to the non-catching position, said engaging end disengages from said front end of said catch member by virtue of expansion of the width of said gap, and said retaining element is adapted to disengage from the second housing so as to unlock the second housing.

2. The positioning unit of claim 1, further comprising an urging member adapted to be mounted in the first housing adjacent to said catch member, said catch member being further movable together with said locking member in the transverse direction from the catching position to an urging position, in which, said urging member is compressed by said catch member so as to urge said catch member to move from the urging position to the non-catching position and to urge said locking member to move from the engaging position to the disengaging position.

3. The positioning unit of claim 2, further comprising a constricting member adapted to be mounted in the first housing and including a casing that has a rear closed end and a front opening opposite to said rear closed end, said catch member including a sliding block that extends through said front opening and into said casing, and a pair of elastic catching arms that extend outwardly of said casing from said sliding block through said front opening and that flare from said front opening to define said gap, said catching arms elastically moving toward each other so as to reduce the width of said gap when sliding over a periphery of said front opening into said casing upon moving said catch member from the non-catching position to the catching position, said catching arms having opposing anchored free ends that engage said engaging end of said locking member when said catch member is positioned at the catching position.

4. The positioning unit of claim 3, wherein said sliding block has a rear end formed with a spring retaining hole, said urging member being in the form of a coil spring that is received in said spring retaining hole and that abuts against said rear closed end of said casing so as to urge said catch member to move to the non-catching position when said catch member is positioned at the urging position.

5. The positioning unit of claim 4, wherein said casing has a top wall formed with a slot, said sliding block having a guide that protrudes therefrom into said slot so as to guide movement of said catch member in the transverse direction.

6. The positioning unit of claim 5, further comprising a mounting seat adapted to be mounted securely in the first housing and having two opposing side walls, opposing front and rear top beams interconnecting said side walls and formed with two opposing front and rear top slits, and a front wall that extends downwardly from said front top beam and that is formed with a through-hole beneath said front top slit, said casing being mounted securely in said mounting seat below and between said front and rear top beams, said locking member including a button adapted to be mounted on the exterior of the first housing, a guide plate that extends from said button through said front and rear top slits, and a pressing shaft that extends from said button and that has a free end which defines said engaging end of said locking member and which extends through said through-hole and into said gap, said guide plate having two opposite sides formed with two opposing wings that engage a periphery of said front top slit so as to prevent removal of said locking member from said front and rear top slits when said locking member moves from the engaging position to the disengaging position.

7. An electronic device, comprising:
first and second housing that are pivoted to each other, said second housing being rotatable relative to said first housing;
a catch member mounted movably in the first housing, and having a front end that defines a gap having a width which is reducible when said catch member is moved in a transverse direction from a non-catching position to a catching position and which is expandable when said catch member is moved from the catching position to the non-catching position; and
a locking member mounted movably on an exterior of said first housing and having an engaging end that extends into said gap and a retaining element that is releasably engageable with said second housing, said locking member being operable for moving said catch member from the non-catching position to the catching position when an external force is applied to said locking member, and being movable together with said catch member in the transverse direction from an engaging position, in which, said catch member is moved to the catching position, said engaging end engages said front end of said catch member by virtue of reduction of the width of said gap, and said retaining element releasably engages said second housing so as to lock said second housing to a disengaging position, in which, said catch member is moved to the non-catching position, said engaging end disengages from said front end of said catch member by virtue of expansion of the width of said gap, and said retaining element disengages from said second housing so as to unlock said second housing.

8. The electronic device of claim 7, further comprising an urging member mounted in said first housing adjacent to said catch member, said catch member being further movable together with said locking member in the transverse direction from the catching position to an urging position, in which, said urging member is compressed by said catch member so as to urge said catch member to move from the urging position to the non-catching position and to urge said locking member to move from the engaging position to the disengaging position.

9. The electronic device of claim 8, further comprising a constricting member mounted in said first housing and including a casing that has a rear closed end and a front opening opposite to said rear closed end, said catch member including a sliding block that extends through said front opening and into said casing, and a pair of elastic catching arms that extend outwardly of said casing from said sliding block through said front opening and that flare from said front opening to define said gap, said catching arms elastically moving toward each other so as to reduce the width of said gap when sliding over a periphery of said front opening into said casing upon moving said catch member from the non-catching position to the catching position, said catching arms having opposing anchored free ends that engage said engaging end of said locking member when said catch member is positioned at the catching position.

10. The electronic device of claim 9, wherein said sliding block has a rear end formed with a spring retaining hole, said urging member being in the form of a coil spring that is received in said spring retaining hole and that abuts against said rear closed end of said casing so as to urge said catch member to move to the non-catching position when said catch member is positioned at the urging position.

11. The electronic device of claim 10, wherein said casing has a top wall formed with a slot, said sliding block having a guide that protrudes therefrom into said slot so as to guide movement of said catch member in the transverse direction.

12. The electronic device of claim 11, further comprising a mounting seat mounted securely in said first housing and having two opposing side walls, opposing front and rear top beams interconnecting said side walls and formed with two opposing front and rear top slits, and a front wall that extends downwardly from said front top beam and that is formed with a through-hole beneath said front top slit, said casing being mounted securely in said mounting seat below and between said front and rear top beams, said locking member including a button mounted on said exterior of said first housing, a guide plate that extends from said button through said front and rear top slits, and a pressing shaft that extends from said button and that has a free end which defines said engaging end of said locking member and which extends through said through-hole and into said gap, said guide plate having two opposite sides formed with two opposing wings that engage a periphery of said front top slit so as to prevent removal of said locking member from said front and rear top slits when said locking member moves from the engaging position to the disengaging position.

13. A portable computer, comprising:
a main body having a first housing;
a display module having a second housing that is pivoted to said first housing so as to permit rotation of said display module relative to said main body;

a catch member mounted movably in said first housing, and having a front end that defines a gap having a width which is reducible when said catch member is moved in a transverse direction from a non-catching position to a catching position and which is expandable when said catch member is moved from the catching position to the non-catching position; and a locking member mounted movably on an exterior of said first housing and having an engaging end that extends into said gap and a retaining element that is releasably engageable with said second housing, said locking member being operable for moving said catch member from the non-catching position to the catching position when an external force is applied to said locking member, and being movable together with said catch member in the transverse direction from an engaging position, in which, said catch member is moved to the catching position, said engaging end engages said front end of said catch member by virtue of reduction of the width of said gap, and said retaining element releasably engages said second housing so as to lock said second housing to a disengaging position, in which, said catch member is moved to the non-catching position, said engaging end disengages from said front end of said catch member by virtue of expansion of the width of said gap, and said retaining element disengages from said second housing so as to unlock said second housing.

* * * * *